United States Patent
Huang et al.

(10) Patent No.: US 6,914,978 B2
(45) Date of Patent: Jul. 5, 2005

(54) PULSE DIALING SYSTEM FOR VOIP MODEM

(75) Inventors: Ying-Chieh Huang, Hsin-Chu (TW); Chung-Ho Wu, Hsin-Chu (TW); Chih-Cheng Huang, Hsin-Chu (TW)

(73) Assignee: Ambit Microsystems Corp., Hsin-Chu (TW)

(*) Notice: Subject to any disclaimer, the term of this patent is extended or adjusted under 35 U.S.C. 154(b) by 519 days.

(21) Appl. No.: 10/064,780

(22) Filed: Aug. 16, 2002

(65) Prior Publication Data

US 2004/0032945 A1 Feb. 19, 2004

(51) Int. Cl.[7] ................................................ H04M 1/31
(52) U.S. Cl. ...................... 379/359; 379/362; 370/352; 455/554.1; 455/554.2
(58) Field of Search ................................ 379/359, 362; 370/352; 455/554

(56) References Cited

U.S. PATENT DOCUMENTS

| | | | |
|---|---|---|---|
| 5,877,872 A | * | 3/1999 | Nomura et al. ............. 358/468 |
| 6,614,786 B1 | * | 9/2003 | Byers ......................... 370/353 |
| 2004/0052242 A1 | * | 3/2004 | Laturell ....................... 370/352 |

* cited by examiner

Primary Examiner—Xu Mei
Assistant Examiner—Walter F. Briney, III
(74) Attorney, Agent, or Firm—Winston Hsu

(57) ABSTRACT

A pulse dialing system for a VoIP modem includes a subscriber line interface circuit (SLIC) for interfacing analog telephone signals to digital signals, a relay for selectively connecting a telephone set with a public switched telephone network (PSTN) or with the SLIC, and a control means, coupled to the SLIC and to the relay, for receiving a digit of a dialed telephone number and for controlling the relay to connect the telephone set with the PSTN and with the SLIC alternatively for a number of cycle(s) equal to the digit of the dialed telephone number so as to generate pulse dialing signals to the PSTN.

4 Claims, 3 Drawing Sheets ns to a VoIP modem, and more

PULSE DIALING SYSTEM FOR VOIP MODEM

BACKGROUND OF INVENTION

1. Field of the Invention

The present invention relates to a VoIP modem, and more specifically, to a VoIP modem that is capable of performing pulse dialing using only one relay.

2. Description of the Prior Art

With the growing popularity of high-speed Internet connections, it is now feasible for Voice over Internet Protocol (VoIP) phone calls to be made over the Internet. A subscriber line interface circuit (SLIC) is used to interface analog telephone signals with a VoIP modem. One main advantage of using the VoIP modem is VoIP phone calls are significantly less expensive than phone calls made over a public switched telephone network (PSTN). However, the voice quality of the VoIP phone calls is sometimes unstable, and, in some important situations, such as in an emergency, the user does not wish to encounter telephone service failure. Therefore, VoIP modems with PSTN backup capability have been developed. In such devices, if the user dials in VoIP mode a telephone number (such as 911) which is specifically pre-stored in the device, the number will be automatically redialed to PSTN to establish a phone call through PSTN instead of through VoIP network.

Please refer to FIG. 1. FIG. 1 is a functional block diagram of a VoIP modem dialing system 10 with PSTN backup capability according to the prior art. The system 10 comprises a VoIP modem 11 and a telephone set 12. The telephone set 12 communicates with a public switched telephone network (PSTN) 14 and a VoIP network 13 through the VoIP modem 11. The VoIP modem 11 comprises a subscriber line interface circuit (SLIC) 18 for interfacing analog telephone signals to digital signals, a relay 16 for selectively connecting the telephone set 12 with the PSTN 14 or with the SLIC 18, a DSP (Digital Signal Processor) 20 coupled to the SLIC 18 and to the relay 16 for controlling the relay 16 to connect the telephone set 12 with the PSTN 14 and with the SLIC 18, a DTMF (Dual Tone Multi-Frequency) coupling circuit 22 for coupling the DTMF redial signals from the SLIC 18 to the PSTN 14 when the user dials in VoIP mode a telephone number which matches a predetermined number in the device, and other circuits 21.

The relay 16 can be a mechanical relay, and can connect the telephone set 12 to either the PSTN 14 or the SLIC 18 at a time. The DSP 20 controls the relay 16 to switch back and forth according to control signals outputted from the DSP 20 to the relay 16.

However, most telephone sets are provided with tone-dialing mode and pulse-dialing mode. Unfortunately, the prior art VoIP modem 11 is only capable of making redialed PSTN phone calls using tone-dialing or dual tone multi-frequency (DTMF) dialing. The prior art VoIP modem 11 cannot provide pulse-dialing features.

SUMMARY OF INVENTION

It is therefore a primary objective of the claimed invention to provide a VoIP modem that can perform pulse dialing using only one relay in order to solve the above-mentioned problems.

According to the claimed invention, a pulse dialing system for a VoIP modem comprises a subscriber line interface circuit (SLIC) for interfacing analog telephone signals to digital signals, a relay for selectively connecting a telephone set with a public switched telephone network (PSTN) or with the SLIC, and a control means, coupled to the SLIC and to the relay, for receiving a digit of a dialed telephone number and for controlling the relay to connect the telephone set with the PSTN and with the SLIC alternatively for a number of cycle(s) equal to the digit of the dialed telephone number so as to generate pulse dialing signals to the PSTN.

It is an advantage of the claimed invention that the pulse dialing system only uses one relay to provide the pulse-dialing capabilities. Having only one relay allows structure of the pulse dialing system to be simpler, and makes the VoIP modem less expensive to produce. With the pulse-dialing capability, the VoIP modem can send pulse-dialing redial signals to PSTN when the user dials a predetermined number with the telephone set in pulse mode.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
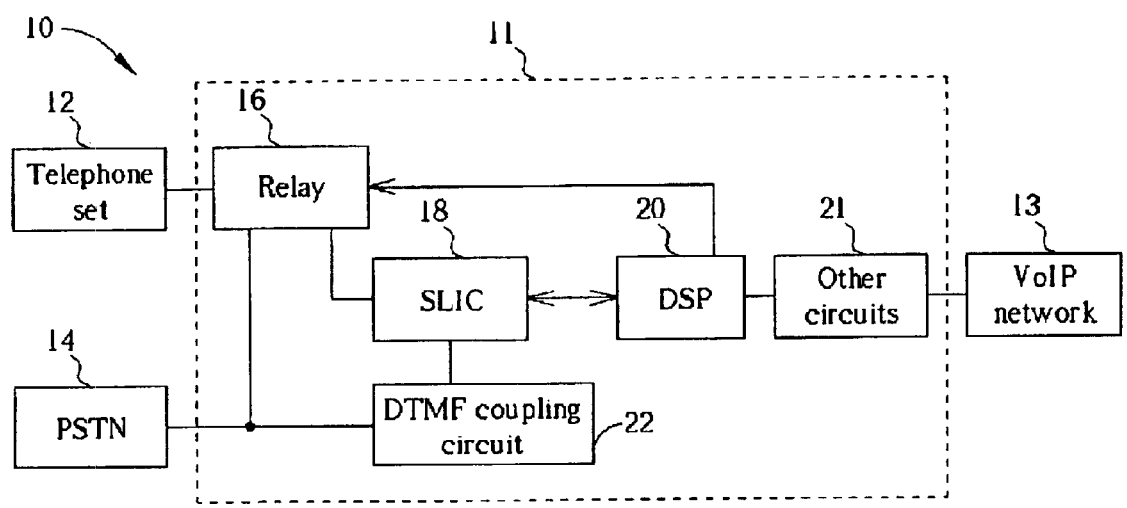
FIG. 1 is a functional block diagram of a prior art VoIP modem dialing system.
Figure 2:
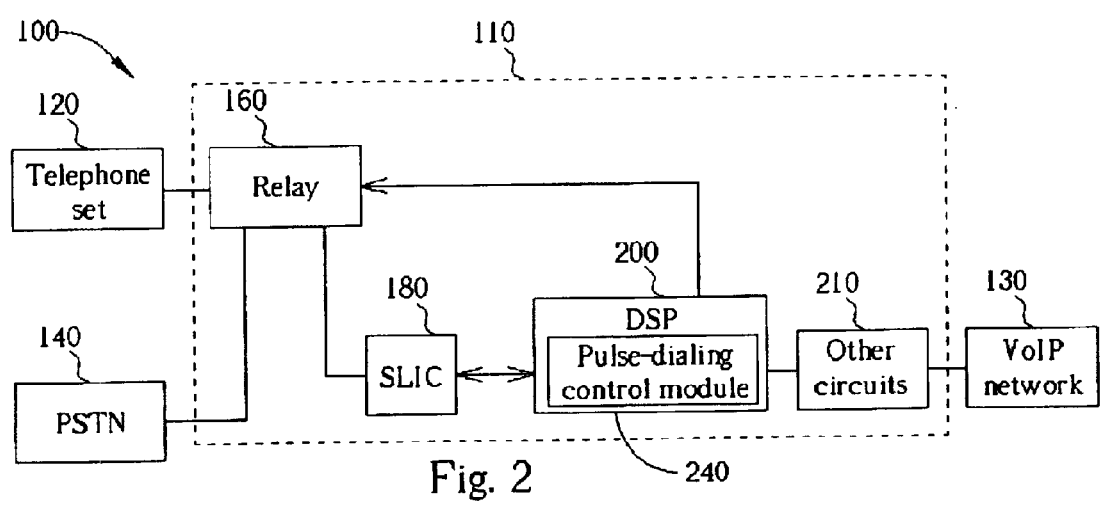
FIG. 2 is a functional block diagram of a VoIP modem dialing system according to the present invention.

Referring to FIG. 2, the present invention offers a new method of controlling a VoIP modem 110 of a VoIP modem dialing system 100 with PSTN backup capability. This new method allows a telephone set 120 that uses pulse-dialing mode to use the VoIP modem 110 to make pulse-dialing redial phone calls over a PSTN 140. This is done by using a pulse-dialing control module 240 in a DSP (Digital Signal Processor) 200 to receive a digit of a dialed telephone number and to control a relay 160 to connect the telephone set 120 with the PSTN 140 and with a SLIC 180 alternatively for a number of cycles equal to the digit of the dialed telephone number in order to generate pulse dialing signals to the PSTN 140.

In the preferred embodiment of the invention, the VoIP mode, in which the relay 160 is controlled to connect the telephone set 120 to the SLIC 180, is set as the default mode of the VoIP modem 110. The DSP 200 controls the relay 160 to automatically connect the telephone set 120 to the PSTN 140 when the VoIP modem is turned off, so that the user may dial a phone number directly to the PSTN 140. Because of this, the telephone set 120 can maintain a connection to the PSTN 140 even if the VoIP modem 110 does not have power.

In the VoIP mode, if the user dials a telephone number which matches a predetermined number stored in the device, the VoIP modem 110 will automatically redial the number to the PSTN by using pulse-dialing. In the invention, besides the relay 160, no additional relays are required for providing the VoIP modem 110 with pulse-dialing capability. This is accomplished by switching the relay 160 such that the telephone set 120 is alternately connected to the PSTN 140 and the SLIC 180. The number of times the relay 160 is switched back and forth is equal to the value of a digit of a dialed telephone number. The switching of the relay 160 is controlled by the pulse-dialing control module 240 in the DSP 200.

Figure 3:
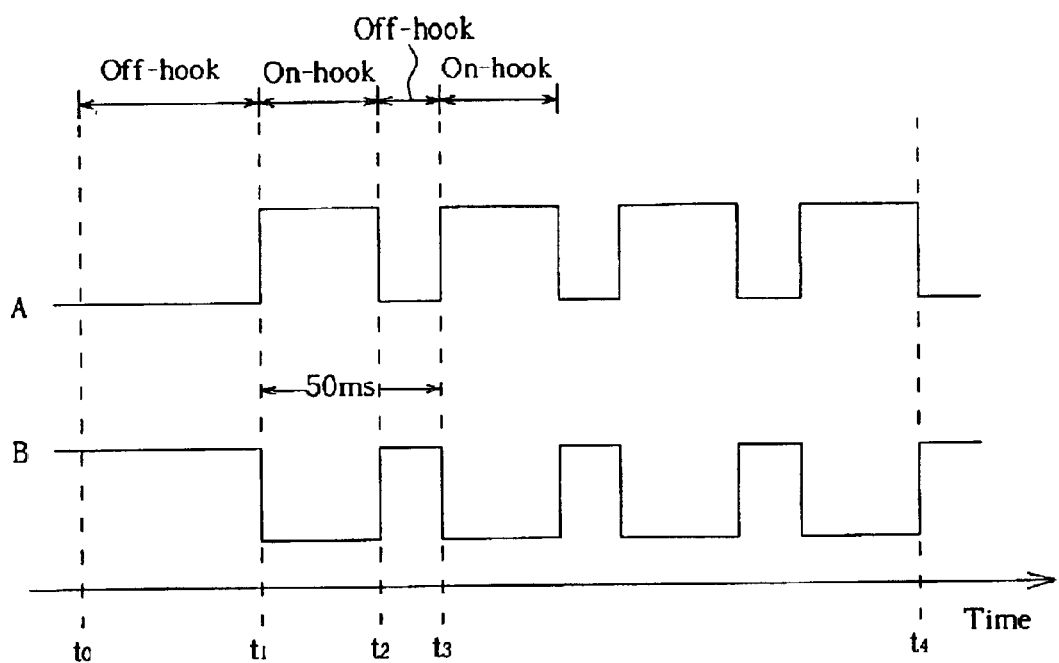
FIG. 3 shows a waveform diagram illustrating pulse dialing signals of the pulse dialing system in FIG. 2 according to the present invention.

Please refer to FIG. 3. FIG. 3 shows a waveform diagram illustrating pulse dialing of the dialing system 100. The horizontal axis of FIG. 3 represents time. Waveform A represents signals sent from the pulse-dialing control module 240 in the DSP 200 to the relay 160. Waveform B represents the status of the connection between the telephone set 120 and the PSTN 140, and this status is either an off-hook or on-hook status. A logical "1" value in waveform B indicates the telephone set 120 is connected to the PSTN 140, which is also called an off-hook state. A logical "0" value in waveform B indicates the telephone set 120 is connected to the SLIC 180.

When the pulse-dialing control module 240 begins the pulse-dialing procedures, it first controls the switch to connect the telephone set 120 to PSTN 140, and the PBX (Private Branch exchange) will then be notified that the telephone set 120 is in an off-hook state. As shown in waveform A, at time t0 the pulse-dialing control module 240 sends a logical "0" signal to the relay 160. A logical "0" causes the relay 160 to connect the telephone set 120 to the PSTN 140. This connection of the telephone set 120 to the PSTN 140 is shown by the logical "1" value at time t0 in waveform B.

Once the telephone set 120 is off-hook, a telephone call can be made using the VoIP modem dialing system 100. For example, FIG. 3 shows the generation of the digit "3" dialing pulse. At time t1, the pulse-dialing control module 240 sends a logical "1" control signal to the relay 160. A logical "1" causes the relay 16 to connect the telephone set 120 to the SLIC 180 to create a on-hook status. Likewise, the telephone set 120 is disconnected with the PSTN 140 as shown by the logical "0" at time t1 in waveform B. Then, at time t2, the pulse-dialing control module 240 sends a logical "0" control signal to the relay 160, and, at time t3, the pulse-dialing control module 240 sends a logical "1" control signal to the relay 160. Thus, a first pulse is generated. The interval between t1 and t3 is about 50 ms. This process continues, until a total of three pulses have generated a series of three off-hook to on-hook status changes. Finally, at time t4, the three pulses have all been transmitted, and the off-hook status of the telephone set 120 is restored. As shown in waveform B, at time t4 the telephone set 120 is connected to the PSTN 140 for completion of a telephone call.

Compared to the prior art, the present invention VoIP modem dialing system 100 can use a circuit having only one relay to provide pulse-dialing capabilities. The relay 160 is simply switched back and forth between the PSTN 140 and the SLIC 180 to perform pulse-dialing. Having only one relay allows structure of the pulse dialing system to be simpler, and makes the VoIP modem less expensive to produce.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for generating pulse dialing signals to a public switched telephone network (PSTN) by a VoIP (Voice over Internet Protocol) modem having a relay for selectively connecting a telephone set with the PSTN or with a subscriber line interface circuit (SLIC) of the VoIP modem, the method comprising:

switching the relay to connect the telephone set with the PSTN and with the SLIC alternatively for a number of cycle(s) equal to a digit of a dialed telephone number.

2. A pulse dialing system for a VoIP modem, comprising:

a subscriber line interface circuit (SLIC) for interfacing analog telephone signals to digital signals;

a relay for selectively connecting a telephone set with a public switched telephone network (PSTN) or with the SLIC; and a control means, coupled to the SLIC and to the relay, for receiving a digit of a dialed telephone number and for controlling the relay to connect the telephone set with the PSTN and with the SLIC alternatively for a number of cycle(s) equal to the digit of the dialed telephone number so as to generate pulse dialing signals to the PSTN.

3. The system of claim 2, wherein said control means is a digital signal processor.

4. A method for making a pulse dialing telephone call with a public switched telephone network (PSTN) by a VoIP (Voice over Internet Protocol) modem including a control means and a relay for selectively connecting a telephone set with the PSTN or with a subscriber line interface circuit (SLIC) of the VoIP modem, the method comprising:

receiving a dialed telephone number in the control means; and controlling the relay by the control means to connect the telephone set with the PSTN and with the SLIC alternatively for a number of cycle(s) equal to each dialed digit of the telephone number so as to generate pulse dialing signals to the PSTN.

* * * * *